United States Patent Office 3,081,343
Patented Mar. 12, 1963

3,081,343
POLYETHERS FROM POLYACETALS AND OLEFINS
Rudolf Merten, Koln-Mulheim, Germany, assignor, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Oct. 20, 1958, Ser. No. 768,657
Claims priority, application Germany Oct. 24, 1957
3 Claims. (Cl. 260—491)

This invention relates generally to a process for the production of polyethers and, more particularly, to a process for the production of polyethers from polyacetals and olefines.

It has been known heretofore to react monoacetals with olefines in the presence of an acid catalyst to obtain ethers of a substituted propane-1,3-diol. It has also been known heretofore to produce polyacetals from polyhydroxyl compounds and aldehydes. The polyacetals are formed by a condensation of polyhydric alcohols and mixtures of mono- and polyhydric alcohols with aldehydes, such as formaldehyde, or by condensation of the polyhydric alcohols with alkines and alkine derivatives of vinyl ether. The polyacetals derived in this manner are usually viscous, oily substances which are subject to degradation, especially in an acid medium, because of the acetal groups and their known hydrophilic character. Accordingly, polyacetals have heretofore found little utility in reactions involving the use of acids.

It is a primary object of the present invention to provide a process for making novel polyethers. It is another object of the present invention to provide new and novel polyethers suitable as an intermediate in the production of polyurethanes. Still another object of the present invention is to provide new and novel polyethers containing free hydroxyl groups. A further object of the present invention is to provide polyethers which are useful in modifying epoxy resins. Still another object of the present invention is to provide polyethers having free hydroxyl groups which are suitable for forming polyesters by condensation with unsaturated dicarboxylic acids.

The above objects and others are accomplished, generally speaking, in accordance with this invention by reacting a polyacetal with an olefine in the presence of an acid catalyst. The invention is predicated on the surprising discovery that useful polyethers may be obtained by the reaction of a polyacetal with an olefine in the presence of an acid catalyst in spite of the known hydrophilic character of the acetal group.

The reaction mechanism, in general, may be illustrated by the following equation:

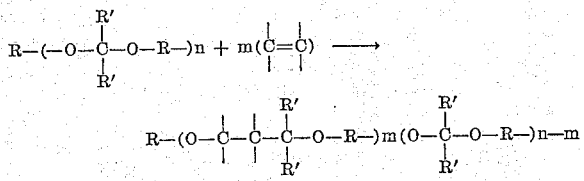

wherein R represents an organic radical, R' is a member selected from the group consisting of a hydrogen atom and an organic radical, n is an integer, and m is an integer which is equal or less than n.

If the acetal group is a cyclic acetal group, the reaction mechanism may be illustrated by the following equation:

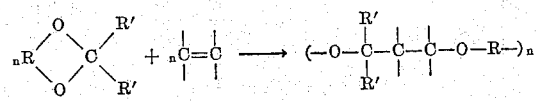

wherein R represents an organic radical, R' is a member selected from the group consisting of an hydrogen atom and an organic radical, and n is an integer.

Any suitable polyacetal may be used in accordance with the present invention. Suitable polyacetals are those compounds having more than one acetal group and the acetal group may be either cyclic or non-cyclic or the acetal groups may be mixtures of cyclic or non-cyclic-containing compounds. Broadly speaking, the invention, therefore, contemplates the use of any polyacetal compound, however, it is preferred to use polyacetals which contain free hydroxyl groups in the range of from about 0.5% to about 15% by weight.

Suitable polyacetals are, for example, the reaction products of an oxo compound, such as, for example, formaldehyde, acetaldehyde, or glyoxal with a suitable polyhydroxyl compound. Any suitable polyhydroxyl compound may be used, such as, for example, ethylene glycol, propane-1,2-diol, propane-1,3-diol, butanediol, butene-2-di-1,4-ol, butine-2-di-1,4-ol, butanetriols, pentanediols, hexanediols, hexanetriols, glycerine, trimethylol propane, pentaerythritol, 7,18-di-hydroxyoctadecane, sorbitol, 4,4'-dihydroxydiphenyl methane, 4,4'-dihydroxydiphenyl dimethyl methane, 4,4'-dihydroxy-dicyclohexyl methane, 4,4'-dihydroxydicyclohexyl dimethyl methane, hydrogenation products of ethylene-carbon monoxide copolymers, the reaction products of these alcohols with alkylene oxides, such as, ethylene oxide, propylene oxide, butylene oxide, styrene oxide, epichlorhydrin, tetra-hydrofuran, and also the polymers of alkylene oxides having terminal hydroxyl groups, reaction products of the above polyhydroxy compounds with unsaturated compounds, such as, for example, glycerine monomethacrylic acid esters, as well as their polymers and co-polymers, polyesters, such as, castor oil, phthalic acid diglycol ester, ricinoleic acid glycol ester, polyesters containing OH groups, for example of glycol and adipic acid, fumaric acid, maleic acid, etc. which can also contain monofunctional components, such as, for example, oleic acid, incorporated by condensation; polythioethers with terminal hydroxy groups, wholly or partially saponified polyvinyl acetate, reaction products containing hydroxy groups and obtained from acid amides and alkylene oxides, such as, for example, adipic acid-bis-oxethyl methyl amide. Furthermore, monohydric alcohols, such as, methanol, ethanol, allyl alcohol, aleyl alcohol, propargyl alcohol, etc. and their oxalkylation products, can be used in subordinate amounts admixed with polyhydroxy compounds.

The alcohols and also the acetals can thus contain other atom groupings, both in the chain and also laterally, such as, for example, halogens, ester groups, amide groups, nitro groups, ether, thioether groups, sulpho groups, carboxyl groups, urethane groups and epoxide groups, heterocyclic rings, and unsaturated groupings.

The following are also to be considered as polyacetals: reaction products of alcohols with alkines, such as, acetylene butine-2-di-1,4-ol, etc.; re-acetalisation products of the acetal of a low-boiling alcohol and a higher-boiling oxycompound, for example of dibutyl acetaldehyde acetal and hexane-1,6-triol, as well as soluble polymers for formaldehyde and acetaldehyde. The polyacetals also include, for example, the condensation products of xylene and formaldehyde and the soluble condensation products of phenols, urea, or melamine with formaldehyde, which can perhaps be produced in combination with alcohols or glycols.

The components used for the production of the polyacetals can, of course, also be mixed in any desired manner.

As olefines, it is possible to use practically all compounds which contain one or even more activated carbon-carbon double bonds, such as, for example, hydrocarbons with an activated double bond, such as, propylene, polypropylenes, butylene, isobutylene, diisobutylene, triisobutylene, styrene cyclohexane, trimethyl ethylene, compounds with several carbon-carbon double bonds, such as, buta-1,3-diene, isoprene and divinyl benzene; the olefines can also contain other atom groupings, such as, for example, halogens, ester groups, amide groups, nitro groups, ether groups, thioether groups, acid groups, urethane groups, epoxy groups, heterocyclic rings. Such compounds are, for example, methallyl chloride, cinnamic acid esters, vinyl ester, vinyl ether, chloroprene.

The olefines can be used in an excess as a deficiency or in the stoichiometric quantities based on the acetal groups present, and in this way the yield and progress of the reaction can be influenced. When using diolefines, the reaction can be so conducted that only one double bond participates in the reaction. In this way, products are formed which still carry carbon-carbon double bonds.

In the modification with olefins, it is, of course, also possible to incorporate partially polymerized monomers. For example, in the reaction with isobutylene, the possibility exists of the isobutylene being initially polymerized to form polymers of low molecular weight such as diisobutylene, etc., which are then incorporated. This simultaneous polymerization depends on the starting components and the reaction conditions. Polymers of high molecular weight are only formed in a subordinate quantity.

As well as the addition of the olefins, the presence of acid catalysts in the addition and subsequent working up results in a certain degradation of the polyacetals, which is expressed in a deviation of the OH number from the values to be acquired theoretically. The extent of this degradation depends essentially on the nature of the catalyst, the temperatures, the reaction time, and especially the method of working up.

By subsequent treatment in an acid medium, the polyethers still containing acetal groups can be converted into pure polyethers with terminal hydroxyl groups. In the case where polyacetals are used which contain aromatic rings, it is not clear whether an addition of the olefine to the aromatic substances may not take place as well as the reaction which is claimed.

The conversion of the olefine introduced depends on the conditions chosen and can reach 100% with reactive systems.

Any suitable catalyst may be used in accordance with this invention, such as, for example, compounds as are used in Friedel-Crafts reactions. Examples of specific compounds are the boron halides, such as, boron trifluoride, boron trichloride, boron tribromide, their addition products with ether, such as, for example, boron trifluoride etherate, inorganic acids, such as, sulphuric acid, hydrochloric acid, perchloric acid, phosphoric acid, inorganic and organic acid halides, such as, phosphorus pentachloride, phosphorus trichloride, chlorosulphonic acid, fluorosulphonic acid, mepasin sulphochloride, anhydrous metal halides, such as, iron chloride, zinc chloride, zinc bromide, aluminum chloride, tin tetrachloride, chromium chloride, copper chloride, nickel chloride, organic sulphonic acid, such as, benzene-sulphonic acid, toluene-sulphonic acid, benzene-disulphonic acid and also condensation products of higher molecular weight which are produced therefrom.

The amount of catalyst employed can fluctuate within wide limits and is dependent on the system chosen. Amounts of from about 0.01 to about 15%, based on the polyacetal introduced, may be used.

The process is carried out by combining the starting components in any desired sequence, but it is preferred not to combine the catalyst with the undiluted olefine. Depending on the nature of the components used, the reaction takes place at low temperatures or at elevated temperatures, preferably from −20° to +100° C. It also may be desirable to use elevated pressure. On completion of the reaction, the catalyst is removed in the usual way and the product obtained is freed from any monomeric olefine which may still be present.

A largely hydrophobic character is given to the polyacetals according to the nature and quantity of olefine incorporated. This leads to the water solubility of the polyacetals modified in this way being reduced. In many cases they become completely insoluble. The hydrophobic character of the compounds and the lower percentage of acetal groupings which are present consequently also greatly reduces the sensitivity to hydrolysis. Simultaneously, the incorporation of the olefines generally causes a drop in viscosity, which also occurs with the aromatically substituted olefines, such as, for example, styrene. The use of diolefines naturally leads to products of higher viscosity.

The polyethers of a molecular weight of at least about 500, which are obtained according to the present invention, can have very different properties because of the diversity of the process and can, therefore, be used for many purposes. The polyether acetals and the pure polyethers obtained by acid cleavage as polyhydroxyl components may be used in reactions according to the polyisocyanate polyaddition process to form cellular or homogeneous polyurethane plastics.

Any suitable organic polyisocyanate may be used ni accordance with the present invention, such as, for example, hexamethylene diisocyanate, diphenyl methane diisocyanate, p-phenylene diisocyanate, 4,4′-diphenyl methane diisocyanate, 1,5-naphthalene diisocyanate, and tolylene diisocyanate and isomeric mixtures thereof and the like. The polyethers of the present invention are also useful for modifying epoxy resins and may also be incorporated into polyesters by condensing the polyether with an unsaturated dicarboxylic acid, such as, for example, maleic acid, are suitable for copolymers. The polyether acetals are also excellently suitable for further condensation with compounds which are able to react further with formaldehydye, such as, for example, melamine, and phenol formaldehyde condensation products.

The invention is illustrated by the following examples without limitation thereto, the parts being by weight.

*Example 1*

About 498 g. of a polyacetal obtained from the reaction of dioxalkylated butane-1,4-diol and formaldehyde, having an OH number of about 39.7, an acid number of about 0.8, a refractive index of about $n_D^{20}$ 1.4650, a viscosity of cp. 25° C. 3930, a density of 1.08, and is composed of about 56.6 percent carbon, and about 9.6 percent hydrogen, are dehydrated for about 30 minutes at a temperature of about 90° C. in vacuo and heated to a temperature of about 70° C. with exclusion of moisture and while stirring, and then about 20 ml. of boron trifluoride etherate are added to the polyacetal. About 262 g. of freshly distilled styrene are also then added dropwise at the same temperature over a period of about 2 hours. The mixture is then kept for about another 10 hours at a temperature of about 70° C., the refractive index $n_D^{20}$ rising from about 1.4982 to about 1.5042. A solution of about 70 g. of soda in about 500 ml. of water is then added and the mixture stirred for about 30 minutes at a temperature of from about 60° C. to about 70° C. The oily reaction product is separated out while still as hot as possible and free from water and unreacted styrene in vacuo at an outside temperature of from about 110° C. to about 120° C. About 30 percent of the styrene used is recovered. Insoluble and inorganic constituents are thereafter filtered off by using a pressure-type suction filter. In contrast to the starting material, the material which is obtained after reaction is a light yellow oil which is obtained after reaction is a light yellow oil which is insoluble in water, has a viscosity of about cp. 20° C., 1735, a refractive index of about $n_D^{20}$ 1.5020, an OH number of about 45.5, an acid number of about 0.3, and is composed of about 66 percent carbon, about 8.89 percent hydrogen.

The analytical data which is obtained conforms to an incorporation of from about 60 percent to about 70 percent of the theoretical amount of the styrene added to the reaction mixture. An infra-red spectrum of the reaction product indicates new bands which are not present either in the polystyrene, styrene or starting polyacetal. Moreover, some of the characteristic bands of styrene and polystyrene are completely lacking in the reaction product.

About 75 g. of the polyacetal ether thus obtained are boiled under reflux for about 6 hours with about 100 ml. of about 0.5 N hydrochloric acid. After refluxing the aqueous phase is then removed and the residue is made alkaline with a strong soda solution and worked up as described above. An oil is obtained which is still insoluble in water and the OH number of this oil having increased to about 131.0 and the refractive index has increased to about 1.5142.

*Example 2*

About 9 g. of gaseous boron trifluoride are introduced at a temperature of about 40° C. into about 498 g. of polyacetal according to the process of Example 1. The temperature is then raised to about 70° C. and about 262 g. of styrene are added dropwise over a period of about 2 hours at the same temperature. This temperature is maintained for about another 6 hours, the index of refraction $n_D^{20}$ rising from about 1.4855 to about 1.4965. The procedure described in Example 1 is followed and with incorporation of about 65% styrene and recovery of about 30% of the styrene used in the unreactive form, there is obtained a water-insoluble, yellowish-brown oil, the infra-red spectrum of which is identical with the substance obtained according to the process of Example 1. The reaction product has an index of refraction of about $n_D^{20}=1.4988$, a viscosity of cp. 25° C. of about 1.945, an OH number of about 33.7, a density of about 1.076, and a composition of about 64.5 percent carbon and about 9.14 percent hydrogen.

*Example 3*

About 10 ml. of boron trifluoride etherate are added at room temperature to about 249 g. of dehydrated polyacetal used according to the process of Example 1. 68 g. of isobutylene are then added in the autoclave at 20° C. within a period of 2 hours and the temperature is maintained for another 2 hours at 20° C. and then the mixture is stirred for 6 hours at 40° C. About 30 percent of the theoretical amount of isobutylene are taken up. The oily, water-insoluble reaction product is then treated for 30 minutes at 60–70° C. with the solution of 10 g. of sodium hydroxide and 15 g. of soda in 250 ml. of water, separated and dehydrated in vacuo with an external temperature of 110–120° C. The yield is quantitative. The product has the following physical values: $n_D^{20}=1.4602$, cp. 25° C.=298, OH number=57.4, $d=0.953$, 58.83 percent carbon, 9.90 percent hydrogen.

The infra-red spectrum shows some new bands which are different from those of the starting materials. Bands of the polymeric isobutylene do not appear.

About 75 g. of the polyacetal ether which is obtained are boiled for 4 hours under reflux with 100 ml. of 2 N-hydrochloric acid. A water-soluble product is formed which, after being neutralized with caustic potash solution, is salted out by adding solind sodium chloride and can thus be separated. Dehydration is effected at 110–120° C. and the substance is thereafter filtered off from insoluble constituents. The oil obtained has the following physical values: $n_D^{20}=1.4660$, OH number 351.

*Example 4*

After adding isobutylene to the mixture as disclosed in Example 3, the mixture is kept for about 4 hours at a temperature of about 70° C., the pressure being reduced from about 11 atm. to 5 atm. The mixture is worked up according to the process of Example 3. Then about 75 percent to 80 percent of the isobutylene are incorporated into the reaction product. The light yellow oil obtained has the following properties: an index of refraction of about $n_D^{20}=1.4582$, a viscosity of about cp. 25° C.=85, and OH number of about 85.8, and composed of about 61.25 percent carbon and about 10.15 percent hydrogen.

The infra-red spectrum is similar to that of the product which is obtained according to the process of Example 3.

If the same mixture is stirred for about 6 hours at a temperature of about 70° C., a reaction product having the following properties are obtained: an index of refraction of about $n_D^{20}$—1.4587, a viscosity of about cp. 25° C.—81, an OH number of about 101.0, and composed of about 61.14 percent carbon and about 10.21 percent hydrogen.

*Example 5*

About 330 g. of a moderately water-soluble polyacetal obtained from the reaction product of trioxyethylated trimethylol propane and formaldehyde having an OH number of about 268, an acid number of about 1.2, an index of refraction of $n_D^{20}$—1.4723, a viscosity of about cp. 25° C.=1119 are dehydrated in vacuo for about 30 minutes at a temperature of about 90° C. About 7.5 ml. of boron trifluoride etherate are then added and about 98 g. of distilled styrene are introduced dropwise into the reaction mixture within about one hour at a temperature of about 50° C. The mixture is kept for about 6 hours at a temperature of about 70° C., the index of refraction: $n_D^{20}$ value changing from about 1.4862 to about 1.4840 during this time. An oil is obtained which is only slightly soluble in water and which, as described in the procedure of Example 3, is freed from the catalyst and worked up. About 70 percent of the styrene used is recovered and from the reaction mixture about 15 percent of the styrene are incorporated into the reaction product. The polyacetal ether alcohol had the following physical properties: a viscosity of about cp. 25° C.—1118, an OH number of about 256, an index of refraction of about $n_D^{20}=1.4742$, a composition of about 57.0 percent carbon and about 9.40 percent hydrogen.

*Example 6*

About 10 ml. of boron trifluoride etherate are added at a temperature of about 40° C. to about 250 g. of a polyacetal used according to the process of Example 1 and about 106 g. of about 55 percent distilled divinyl benzene (the remainder consisting mainly of ethyl vinyl benzene) are added within a period of about one hour. The mixture is then heated to about 70° C. After about three hours, the refractive index has changed from about 1.4960 to about 1.5006. The product becomes increasingly more viscous and can no longer be stirred about 3½ hours. On cooling, it solidifies to a solid mass which still contains considerable quantities of the free monomer. The bands of a polymeric divinyl benzene prepared by way of comparison are completely lacking in the infra-red spectrum.

*Example 7*

About 200 g. of a water-soluble polyacetal of triethylene glycol and formaldehyde having an OH number of about 45.2, an acid number of about 1.8, an index of refraction of about $n_D^{20}=1.4671$, a viscosity of about 25° C., about 2400 are placed in an autoclave and about 10 ml. of boron trifluoride etherate are added thereto at room temperature and about 100 percent excess of isobutylene equal to about 128 g. are added over a period of about 2 hours. The mixture then is heated for about 10 hours at a temperature of about 70° C., the pressure falling from about 14 to about 6 atm. according to the measuring gauge. From about 80 percent to about 100 percent of the theoretical quantity of isobutylene are incorporated into the reaction product. The water-insoluble oil thus obtained is freed in vacuo at a temperature of about 40° C. from the dissolved gas, and then freed in the usual way from the catalyst, and dehydrated at a temperature of from about 110° C. to about 120° C.

The water insoluble oil has an index of refraction of about $n_D^{20}=1.4535$, a viscosity of 25° C. of about 18.5, and an OH number of about 85.4.

*Example 8*

About 200 g. of polyacetal used according to the process of Example 7 has added thereto about 5 percent boron trifluoride etherate at a temperature of about 40° C. and then the mixture of about 0.1 mol of divinyl benzene and about 1 mol of styrene is added dropwise to the mixture within one hour. By heating the mixture for about 16 hours at a temperature of about 70° C., the refractive index raises from about 1.4976 to about 1.5131. The product obtained is no longer soluble in water and is neutralized with a 10 percent soda solution, then washed with water and freed in vacuo from water and excess styrene at an outside temperature of about 130° C. and is then distilled off. From about 80 percent to about 90 percent of the olefines used are incorporated into the reaction product. The reaction product has an index of refraction of $n_D^{20}=1.5178$, and an OH number of about 50.0, and a viscosity of 25° C. of about 657%, and is composed of about 65.83 percent carbon and about 8.25 percent hydrogen.

Characteristic bands of the polymers of styrene and divinyl benzene are missing from an infra-red spectrum and new bands appear in their place.

*Example 9*

About 250 g. of a dehydrated polyacetal used according to the process of Example 1 having an OH number of about 30.5 and a viscosity of cp. at 25° C. of about 872%, have added thereto about 3 percent of boron trifluoride etherate, about 140 g. of diisobutylene are then added dropwise at a temperature of about 40° C. within one hour. In about 16 hours at a temperature of about 70° C., the refractive index rises from about 1.4568 to about 1.4600. Neutralization is effected with soda solution and the organic phase consisting of two layers is separated out. By distillation at a temperature of about 160° C. in vacuo, there are recovered about 70 percent of the diisobutylene as well as higher homologues. The residue is filtered off. About 20 percent of the diisobutylene are incorporated into the reaction product. It has an index of refraction of about $n_D^{20}$, a viscosity at 25° C. of about 207, an OH number of about 12.5, and is composed of about 58.86 percent carbon and 10.14 percent hydrogen.

*Example 10*

About 250 g. of polyacetal used according to the process of Example 9 are placed in an autoclave and about 4 percent of boron trifluoride etherate by weight are added thereto at room temperature. About 67 g. of butadiene are then added within a period of about 30 minutes. The temperature is kept for about 10 hours at about 70° C. and then the excess butadiene is removed at about 40° C. in vacuo. About 30 percent of the butadiene employed are taken up in the reaction. The product which is obtained and which is sparingly soluble in water is neutralized and worked up as previously described in the foregoing examples. After dehydration at about 120° C. in vacuo, a brown oil remains. The oil has an index of refraction of $n_D^{20}$ of about 1.4709, a viscosity of cp. 25° C. of about 1190 and an OH number of about 52.7 and composed of about 59.47 percent carbon and about 9.77 percent hydrogen and an iodine number of about 39.5 (g. of iodine/100 g. of weighed portion).

*Example 11*

About 250 g. of polyacetal used according to the process of Example 9 are placed in an autoclave and about 12 percent of sublimed ferric chloride by weight are added thereto. About 63 g. of isobutylene are then added at room temperature. On heating to about 70° C., a fall in pressure very quickly occurs, this being ended after about 2 hours. The gas is thereafter removed in vacuo at about 40° C. The water insoluble product obtained is washed twice with water to remove the relatively large quantity of inorganic salt present and then brought to a pH value of about 8 with soda solution and dehydrated at an external temperature of about 120° C. The reaction product is then filtered off from insoluble constituents. About 80 percent of the acetal groups are reacted. The reaction product has an index of about $n_D^{20}=$ about 1.4632, a viscosity of cp. 25° C. of about 99.0, an OH number of about 78.8 and composed of about 63.0 percent carbon and about 10.40 percent hydrogen.

When using the following catalysts, a reaction product having the following values are obtained:

| Catalyst | Percent Iso-butylene Incorporated | $n_D^{20}$ | cp. 25° C. | OH Number | Percent C | Percent H |
|---|---|---|---|---|---|---|
| AlCl₃ | 20 | | | | | |
| HSO₃F | 60–70 | 1.4731 | 160 | 121 | 62.90 | 10.05 |
| H₂SO₄ | ca. 80 | 1.4578 | 51 | 110 | 62.58 | 10.63 |
| SnCl₄ | ca. 70 | | | | | |
| p-toluene sulphonic acid | 70–80 | 1.4578 | 68 | 120 | 61.05 | 10.00 |
| CrCl₃ | ca. 10 | | | | | |
| Polyphosphoric acid | ca. 60 | 1.4592 | 97 | 88.3 | 60.20 | 10.00 |

*Example 12*

About 10 ml. of boron trifluoride etherate are added to about 250 g. of a polyacetal used according to the process of Example 9 and then about 114 g. of methallyl chloride are added dropwise to the reaction mixture within about one hour. The temperature is kept for about 8 hours at about 70° C., the mixture is then neutralized with sodium hydroxide and sodium bicarbonate solutions and the aqueous phase is separated out after adding sodium chloride. The conversion of the methallyl chloride is from about 5 percent to about 10 percent. After treatment of the reaction product is carried out in vacuo at about 120° C., a reaction product having the following values is obtained: an index of refraction of $n_D^{20}=$ to about 1.4656, a viscosity at cp. 25° C. of about 2020, an OH number of about 34.5, and composed of about 0.86 percent chlorine.

*Example 13*

About 10 ml. of boron trifluoride etherate are added at about 50° C. to about 250 g. of polyacetal used according to the process of Example 9 and then about 103 g. of cyclohexane are added to the reaction mixture within about one hour. The temperature is then raised for about 9 hours to about 90° C. and the refractive index changes from about 1.4573 to about 1.4618. Neutralization is then carried out with a sodium hydroxide/sodium bicarbonate solution. The reaction mixture is saturated with sodium chloride and the aqueous phase is separated out and the organic product treated at about 130° C. in vacuo. About 65 percent of the cyclohexane are recovered from the reaction mixture. The reaction product is moderately soluble in water and has the following values: an index of refraction at $n_D^{20}$ of about 1.4687, a viscosity at cp. 25° C. of about 457, an OH number of about 56.5 and composed of about 59.23 percent carbon and about 9.6 percent hydrogen.

*Example 14*

The mixture of about 110 g. of acetic acid vinyl ester and about 1 g. of hydroquinone is added within about one hour at a temperature of about 40° C. to about 250 g. of polyacetal used according to the process of Example 9 and about 10 ml. of boron trifluoride etherate. The temperature is kept for about 7 hours at about 70° C. The mixture is then neutralized as exactly as possible with a sodium hydroxide/sodium bicarbonate solution and the aqueous phase is separated out and water and excess acetic acid vinyl ester are removed at from about 110° C. to about 120° C. in vacuo. From about 60 percent to about 70 percent of the ester are incorporated into the reaction product. After filtering, the reaction product having the following properties is obtained: an index of refraction at $n_D^{20}$ of about 1.4674, a viscosity at cp. 25° C. of about 261, an OH number of about 56.0 and composed of about 57.20 percent carbon and about 8.90 percent hydrogen.

Example 15

About 100 g. of 2,3-dimethyl buta-1,3-diene containing about 1 percent of hydroquinone are added within a period of about one hour at a temperature of about 40° C. to about 250 g. of the polyacetal used according to the process of Example 9 and about 10 ml. of boron trifluoride etherate and the mixture heated for about 7 hours at about 70° C. The refractive index of the reaction product then rises from about 1.4618 to about 1.4712. The reaction product is then worked up, and carried out as previously described and water and excess dimethyl butadiene are removed at about 150° C. in vacuo. About 50 g. of dimethyl butadiene are incorporated into the reaction product. The reaction product obtained is only slightly soluble in water and has the following properties: an index of refraction at $n_D^{20}$ of about 1.4779, a viscosity at cp. 25° C. of about 290, an OH number of about 72.2 and composed of about 63.95 percent carbon and about 10.08 percent hydrogen and an iodine number of about 68.1.

Example 16

About 10 ml. of concentrated sulphuric acid are added to about 250 g. of the polyacetal used according to the process of Example 1 and then about 58 g. of propylene are added at room temperature and the reaction mixture heated for about 10 hours at about 100° C. The pressure of the reaction mixture falls from about 52 atm. to about 28 atm. according to the gauge. The excess propylene is the removed in vacuo at about 40° C. From about 70 percent to about 80 percent is taken up in the reaction product. The mixture is then neutralized and the aqueous phase is separated out after saturation with common salt and dehydrated at about 120° C. in vacuo. A moderately water-soluble product is obtained. The water-soluble product has an index of refraction at $n_D^{20}$ of about 1.4560, a viscosity at cp. 25° C. of about 108, an OH number of about 100 and is composed of about 60.11 percent carbon and about 10.00 percent hydrogen.

By using about 10 ml. of boron trifluoride etherate and about 10 ml. of fluorosulphonic acid, there is obtained a reaction product having from about 20 percent to about 30 percent and from about 60 percent to about 70 percent, respectively, of the theoretical quantity of propylene and having the following analysis values:

|  | $n_D^{20}$ | cp. 25° | OH Number | Percent C | Percent H |
|---|---|---|---|---|---|
| FSO₃H | 1.4550 | 200 | 79.5 | 59.52 | 9.78 |
| BF₃-etherate | 1.4634 | 244 | 102.5 | 58.45 | 9.62 |

Example 17

About 112 g. of a polyacetal obtained by reacetalisation of dibutyl acetaldehyde acetal with hexanedi-1,6-ol having an OH number of about 69.8 and an index of refraction at $n_D^{20}$ of about 600 having about 8 ml. of boron trifluoride etherate added thereto and then about 80 g. of styrene are added within about one hour and a temperature of about 50° C. The mixture is heated for about 5 hours at a temperature of about 100° C. and thereafter neutralized with a sodium hydroxide/sodium bicarbonate solution, the aqueous phase is separated out and freed from water and excess styrene is removed in vacuo at about 120° C. From about 70 percent to about 80 percent of the styrene are incorporated into the reaction product. The dark oil reaction product which is obtained has the following values: an OH number of about 203, a viscosity at cp. 25° C. of about 1880, and an index of refraction at $n_D^{20}$ of about 1.5178.

Example 18

About 573 g. of the polyacetal used in accordance with the process of Example 1 are mixed while stirring with about 6 ml. of concentrated sulfuric acid and about 2 g. of hydroquinone are then added, about 52 g. of isoprene are then added dropwise at room temperature. The reaction mixture is then kept in an autoclave at about half an hour at a temperature of about 90° C. After cooling down to about 45° C. about 112 g. of isobutylene are added and the reaction mixture heated to about 70° C. for about an additional 6 hours. The reaction product is then neutralized at about 70° C. with about 10 g. of finely powdered calcium carbonate. The reaction is treated at about 100° C. in a vacuum of about 15 mm. After filtration a brownish oil reaction product is obtained having a viscosity of about 86 at cp. 25° C., an OH number of about 96 and an iodine number of about 19.8, and an index or refraction at $n_D^{20}$ of about 1.4560.

Example 19

About 700 g. of a polyacetal obtained from about 1 mol of trioxyalkylated trimethylol propane, about 1 mol of dioxalkylated-4,4'-dioxydiphenyl-dimethylmethane, about 3 mols of dioxalkylated butane diol-1,4 and paraformaldehyde having an OH number of about 190, and an acid number of about 2.3, a viscosity at cp. 25° C. of about 1400, an index of refraction at $n_D^{20}$ of about 1.4973, and composed of about 60.45 percent carbon and about 8.85 percent hydrogen are heated to about 90° C. while admixed with 3 g. of hydroquinone and about 70 g. of a dried polystyrene acid cross-linked with about 2 percent divinylbenzene by weight. Within about one hour about 214 g. of styrene are added dropwise to the reaction mixture. The reaction mixture is kept for about 8 hours at about 90° C. The index of refraction at $n_D^{20}$ is increased thereby to an index of refractio nat $n_D^{20}$ of about 1.5214. The reaction product is filtered by suction and heated to about 130° C. at about 15 mm. of mercury. No unreacted styrene is recovered. The brownish oil exhibits the following properties: an OH number of about 176, an acid number of about 2.1, an index of refraction at $n_D^{20}$ of about 1.5280, a viscosity at cp. 25° C. of about 1590, and composed of about 68.43 percent carbon and about 8.40 percent hydrogen.

Example 20

About 450 g. of a polyacetal obtained from dioxalkylated butene-2-diol-1,4 and paraformaldehyde having an OH number of about 32, a viscosity at cp. 25° C. of about 3300, and an index of refraction at $n_D^{20}$ of about 1.4843, and an iodine number of about 114 and about 3 g. of hydroquinone and about 50 g. of the polystyrene sulfonic acid of Example 19 are heated together with about 237 g. of butadiene to about 100° C. for about 10 hours. The pressure is then reduced from about 23 atmospheres to about 7 atmospheres. After cooling the reaction product is filtered and heated to about 130° C. at a vacuum of about 15 mm. A dark oil reaction product is obtained having an OH number of about 258, an acid number of about 1.7, a viscosity at cp. 25° C. of about 153, an index of refraction at $n_D^{20}$ of about 1.4910 and an iodine number of about 130.

Example 21

About 2 ml. of concentrated sulphuric acid are carefully added to about 51 parts by weight (0.5 mol) of butane-1,4-diol methylene ether with a considerable rise in viscosity occurring with generation of heat and dark coloration. About 52 parts by weight (0.5 mol) of styrene are then added dropwise within about one hour at a temperature of about 50° C., and the temperature is raised to about 75° C. In about 6 hours, the refractive index $n_D^{20}$ changes from about 1.5020 to about 1.5259. The reaction product is taken up with ether, washed with dilute sodium bicarbonate solution and the solvent is removed by distillation. The residue is heated in water-jet vacuum to about 120° C. The brown oil obtained has an OH number of about 55 and a refractive index $n_D^{20}$ of about 1.5375. In the infra-red spectrum, bands appear which are different from those of polystyrene and the starting materials.

*Example 22*

About 2 parts by weight of hydroquinone, about 2 parts by weight of butane-1,4-diol and about 40 parts by weight of a polystyrene sulphonic acid cross-linked with about 2 percent of divinyl benzene are added to about 2 mols of butane di-1,4-ol methylene ether and about 4 mols of styrene are added dropwise at about 90° C. within about one hour. The temperature is kept for about another 10 hours at about 90° C., the refractive index $n_D^{20}$ changing from about 1.5360 to about 1.5544. The substance is filtered off from the catalyst by suction, washed with benbene and small quantities of fractions of low molecular weight are distilled off together with the solvent at a temperature and pressure of up to about 170° C. at 0.4 mm. of mercury. A reaction product is obtained having a yield of about 75 percent calculated on the total quantity of reactants used, and has an OH number of about 32.5, an acid number of about 0.3, a refractive index at $n_D^{20}$ of about 1.5790, and a viscosity of about 3740 cp. 25° C.

The infra-red spectrum shows substantial similarity with that of the product obtained according to the process of Example 21, but a small occurrence of certain polystyrene bands can be detected, this showing the presence of low-polymer styrene units.

*Example 23*

About 104 parts by weight (1 mol) of styrene are added dropwise at a temperature of about 70° C. within about one hour to about 162 parts by weight (1 mol) of 4-phenyl-1,3-dioxane, about 1 part by weight of hydroquinone, about 1 part by weight of 1,4-di-(8-hydroxy-ethoxy)-butane and about 10 ml. of boron trifluoride etherate. The reaction mixture is kept for about 5 hours at a temperature of about 70° C. The refractive index $n_D^{20}$ rises from about 1.5338 to about 1.5620. After cooling the reaction product is taken up with about 300 ml. of benzene, washed until neutral with sodium bicrabonate solution and distilled. About 40 percent of the 4-phenyl-1,3-dioxane introduced into the reaction are recovered and the residue forms a mass becoming highly viscous on cooling, having an OH number of about 20.5, an acid number of about 0.7, and composed of about 84.30 percent carbon and about 7.32 percent hydrogen.

In addition to the new bands and a displacement of the ether bands as shown in Example 22, the infra-red spectrum indicates the presence of low-polymer styrene units.

If about 15 parts by weight of a polystyrene sulphonic acid used according to Example 22 are used instead of the boron trifluoride etherate and if the reaction is carried out in about 11 hours at a temperature of about 90° C. about 45 percent of the 4-phenyl-1,3-dioxane are recovered from the reaction mixture and the reaction product obtained has an OH number of about 48.7, an acid number of about 0.3, and is composed of about 85.41 percent of carbon, and about 7.27 percent of hydrogen, has a viscosity at cp. 25° C. of about 7240, and an index of refraction at $n_D^{20}$ of about 1.5922.

By using about 25 parts by weight of polystyrene sulphonic acid and about 2 mols of styrene, practically none of the starting material is recovered. The highly viscous product has an index of refraction at $n_D^{20}$ of about 1.5991, a viscosity at cp. 25° C. of about 100,000, an OH number of about 34.3, an acid number of about 0.2, and is composed of about 86.90 percent of carbon, about 7.32 percent of hydrogen, and about 5.81 percent of oxygen.

*Example 24*

About 40 parts by weight (0.25 mol) of pentaerythritol dimethylene ether are heated with about 50 ml. of di-n-butyl ether to a temperature of about 50° C. and first of all mixed with about 2 ml. of sulphuric acid, then with a mixture of about 52 parts by weight (0.5 mol) of styrene and about 0.5 part by weight of hydroquinone in about 30 minutes. The mixture is heated for about 10 hours at a temperature of about 100° C., the refractive index $n_D^{20}$ rising from about 1.4772 to about 1.5024. After cooling, the reaction product is taken up with benzene, neutralized and distilled in vacuo. About 30 percent of the pentaerythritol dimethylene ether are recovered as well as about 50 percent of the styrene introduced into the reaction mixture. There remains about 50 parts by weight of a yellow and almost solid mass having an OH number of about 17.9 and a refractive index at $n_D^{20}$ of about 1.5955. The high carbon content of about 88.73 percent and about 7.54 percent hydrogen shows that in addition to the appearance of certain polystyrene bands, the incorporation of a more than stoichiometric quantity of styrene, but new bands also appear, these proving the presence of a mixed addition.

*Example 25*

About 74 parts by weight (1 mol) of ethylene glycol methylene ether are heated to a temperature of about 70° C. with about 1 part by weight of ethylene glycol, about 1 part by weight of hydroquinone and about 20 parts by weight of polystyrene sulphonic acid used according to Example 22. About 104 parts by weight (1 mol) of styrene are added dropwise within a period of about one hour. In about six hours at a temperature of about 90° C., the refractive index at $n_D^{20}$ has changed from about 1.5340 to about 1.5508. The mixture is then filtered from the catalyst with suction, washed with benzene and distilled at a pressure of about 0.1 mm. and an external temperature of about 160° C. In this way, only a minimum quantity of styrene are recovered. The residue reaction product, about 80 percent of the total input, has the following value: an index of refraction at $n_D^{20}$ of about 1.5672, a viscostiy at cp. 25° C. of about 10,900, an OH number of about 75.4, an acid number of about 1.0.

*Example 26*

About 4 ml. of concentrated sulphuric acid are carefully added to about 1 mol of butane di-1,4-ol methylene ether, about 1 part by weight of 1,4-di-(beta-hydroxy-ethoxy)-butane and about 1 part by weight of hydroquinone and then heated with about 112 parts by weight (2 mols) of isobutylene for a period of about 8 hours at a temperature of about 50° C. The pressure falls within about one hour to 0 atm. according to the gauge. The crude reaction product is neutralized with about 9 parts by weight of calcium carbonate, filtered and freed from secondary products in vacuo at about 12 mm. and an outside temperature of about 150° C. A brown reaction product is left which has an OH number of about 115 and an acid number of about 1.0, the refractive index at $n_D^{20}$ being about 1.4634 and the viscosity at cp. 25° C. being about 25.2.

*Example 27*

About 1 mol of 4-phenyl-1,3-dioxane, about 1 part by weight of butane-1,4-diol, about 1 part by weight of hydroquinone and about 25 parts by weight of polystyrene sulphonic acid used according to Example 22, are heated with about 2 mols of butadiene for a period of about 8 hours at a temperature of about 110° C. with the pressure falling from about 12 atm. to about 2 atm. according to the gauge. The substance is filtered off from the catalyst, washed with carbon tetrachloride and distilled up to an outside temperature of about 160° C. and a pressure of about 0.03 mm. No starting material is recovered and the yellowish reaction residue has the following values: an OH number of about 53.5, an acid number of about 0.4, an iodine number (g. of iodine to 100 g. of weighed portion) of about 86.0, an index of refraction at $n_D^{20}$ of about 1.5662, and a viscosity at cp. 25° C. of about 7084.

It is understood that any suitable polyacetal as hereinbefore disclosed may be substituted in any of the above examples and that any suitable olefine as hereinbefore described may likewise be substituted in any of the foregoing examples.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A linear polyether having a molecular weight of at least 500 prepared by the process which comprises reacting at a temperature of from about −20° C. to about +100° C. a linear polyacetal which contains free hydroxyl groups in the range of from about 0.5% to about 15% by weight and prepared by reacting an aldehyde selected from the group consisting of formaldehyde, acetaldehyde and glyoxal and a polyhydric alcohol, with an ethylenically unsaturated compound containing at least one activated carbon-carbon double bond and having less than about 13 carbon atoms, said unsaturated compound being free from heterocyclic rings in admixture with an acid catalyst present in an amount of from about 0.01 to about 15% by weight based on the weight of said linear polyacetal.

2. A method for preparing linear polyethers having a molecular weight of at least 500 which comprises reacting a linear polyacetal which contains free hydroxyl groups in the range of from about 0.5% to about 15% by weight and prepared by reacting an aldehyde selected from the group consisting of formaldehyde, acetaldehyde and glyoxal and a polyhydric alcohol, with an ethylenically unsaturated compound containing at least one activated carbon-carbon double bond and having less than about 13 carbon atoms, said unsaturated compound being free from heterocyclic rings in admixture with an acid catalyst present in an amount of from about 0.01 to about 15% by weight based on the weight of said linear polyacetal.

3. A method for preparing linear polyethers having a molecular weight of at least 500 which comprises reacting at a temperature of from about −20° C. to about +100° C. a linear polyacetal which contains free hydroxyl groups in the range of from about 0.5% to about 15% by weight and prepared by reacting an aldehyde selected from the group consisting of formaldehyde, acetaldehyde and glyoxal and a polyhydric alcohol, with an ethylenically unsaturated compound containing at least one activated carbon-carbon double bond and having less than about 13 carbon atoms, said unsaturated compound being free from heterocyclic rings in admixture with an acid catalyst present in an amount of from about 0.01 to about 15% by weight based on the weight of said linear polyacetal.

References Cited in the file of this patent

UNITED STATES PATENTS

| | | |
|---|---|---|
| 2,165,962 | Mueller-Cunradi et al. | July 11, 1939 |
| 2,224,663 | Berg et al. | Dec. 10, 1940 |
| 2,366,738 | Loder et al. | Jan. 9, 1945 |
| 2,382,640 | Kenyon et al. | Aug. 14, 1945 |
| 2,394,862 | Loder et al. | Feb. 12, 1946 |
| 2,479,146 | Wood | Aug. 16, 1949 |
| 2,522,680 | Kropa et al. | Sept. 19, 1950 |
| 2,601,572 | Thomas et al. | June 24, 1952 |